US009816861B2

(12) United States Patent
Streeter et al.

(10) Patent No.: US 9,816,861 B2
(45) Date of Patent: Nov. 14, 2017

(54) DEVICE AND METHOD FOR CHARACTERIZING AN ULTRASHORT LASER PULSE

(71) Applicant: Deutsches Elektronen-Synchrotron DESY, Hamburg (DE)

(72) Inventors: Matthew Streeter, Hamburg (DE); Jens Osterhoff, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 251 days.

(21) Appl. No.: 14/920,260

(22) Filed: Oct. 22, 2015

(65) Prior Publication Data
US 2016/0116338 A1   Apr. 28, 2016

(30) Foreign Application Priority Data

Oct. 23, 2014   (EP) .................................... 14190069

(51) Int. Cl.
  *G01J 3/00*   (2006.01)
  *G01J 3/457*   (2006.01)
  *G01J 11/00*   (2006.01)
  *H01S 3/00*   (2006.01)
  *G01J 3/02*   (2006.01)

(52) U.S. Cl.
  CPC ............. *G01J 3/457* (2013.01); *G01J 3/0205* (2013.01); *G01J 11/00* (2013.01); *H01S 3/005* (2013.01); *H01S 3/0014* (2013.01); *H01S 3/0092* (2013.01)

(58) Field of Classification Search
  CPC ...... H01S 3/0092; H01S 3/005; H01S 3/0014; G01J 11/00; G01J 3/457
  See application file for complete search history.

(56) References Cited

U.S. PATENT DOCUMENTS

2002/0057435 A1   5/2002   Trebino
2002/0154384 A1   10/2002  Chen et al.

FOREIGN PATENT DOCUMENTS

WO   2013054292 A1   4/2013

OTHER PUBLICATIONS

Trebino, R.; Measuring Ultrashort Laser Pulses in the Time-Frequency Domain Using Frequency-Resolved Optical Gating; Rev. Sci. Instrum. 68 (9), Sep. 1997, pp. 3277-3295.
Miranda, M.: Simultaneous Compression and Characterization of Ultrashort Laser Pulses Using Chirped Mirrors and Glass Wedges; Optics Express, 20(1), 2012, pp. 688-697.

*Primary Examiner* — Michael A Lyons
*Assistant Examiner* — Maurice Smith
(74) *Attorney, Agent, or Firm* — Murtha Cullina LLP

(57) ABSTRACT

The invention relates to a device (2) and to a method for characterizing an ultrashort laser pulse. Furthermore, the invention relates to use of a self-contained optical assembly in a device (2) for characterizing an ultrashort laser pulse. The device (2) comprises an imaging optical element (4) configured to image the incident laser pulse (6) in a direction of a straight line (L). A first optical element (10) is configured to apply predetermined varying group delay dispersion on the line focused laser pulse. A non-linear optical element (14) is configured to generate a second harmonic laser pulse (30). An optical grating (20) generates a diffraction of the second harmonic laser pulse, which is imaged on a flat sensor (24). A processing unit (36) determines a best fit for the captured image thereby calculating a frequency spectrum and a spectral phase of the laser pulse.

15 Claims, 2 Drawing Sheets

DEVICE AND METHOD FOR CHARACTERIZING AN ULTRASHORT LASER PULSE

CROSS REFERENCE TO RELATED APPLICATIONS

The present application claims priority benefit under European Patent Application No. 14 190 069.6 filed on Oct. 23, 2014, the entirety of which is incorporated by reference herein.

FIELD OF THE INVENTION

The invention relates to a device and method for characterizing an ultrashort laser pulse. Furthermore, the invention relates to use of a self-contained optical assembly in a device for characterizing an ultrashort laser pulse.

BACKGROUND OF THE INVENTION

Lasers emitting ultrashort laser pulses having pulse durations of few tenths of femtoseconds are widely used for scientific research and technical applications. In all cases, it can be vitally important to measure the temporal profile of the laser pulse.

Within the context of this specification, characterizing an ultrashort laser means characterizing the temporal-spectral properties of the laser pulse.

Traditionally, ultrashort laser pulses have been characterized by non-linear autocorrelation diagnostics. Although relatively simple to implement, this analysis fails to provide complete information about the pulse. An improved approach is frequency resolved optical gating (FROG). With FROG it is possible to measure pulses over a wide range of wavelength and pulse duration. There are many versions of FROG, which in principle all rely on spectrally resolving a time-gated signal. A variety of different FROG measurement techniques is described in: Trebino, R.: Measuring Ultrashort Laser Pulses in the Time-Frequency Domain using Frequency-Resolved Optical Gating, Rev. Sci. Instrum. 68 (9), September 1997. In a FROG measurement, by spectrally resolving an autocorrelation signal, a two dimensional trace is created from which a characterization of a given pulse can be derived using an iterative algorithm.

Another approach, which is widely used for characterization of ultrashort laser pulses, is spectral phase interferometry for direct electric-field reconstruction (SPIDER). The SPIDER methods do not rely on temporal gating, but on interferometry in the spectral domain. The spectrum of a given pulse is made to interfere with a frequency-shifted (sheared) replica of itself. However, the quality of the phase measurement strongly depends on the accuracy of the delay between the two replicas and therefore, SPIDER-methods have high demands with respect to calibration of the optical setup.

A further approach with respect to the characterization of ultrashort laser pulses is known from: Miranda, M.: Simultaneous Compression and Characterization of Ultrashort Laser Pulses using Chirped Mirrors and Glass Wedges, Optics Express, 20(1), 688-697 (2012). The method, which is described in this scientific paper, applies a chirped mirror compressor setup to ensure that the pulse is negatively chirped. Subsequently, the pulse transits a pair of oppositely aligned glass wedges adding a certain amount of dispersion to the pulse. A second harmonic of the pulse is generated and the spectrum of said second harmonic is subsequently measured in the frequency domain.

For characterization of the pulse, a thickness of the glass, which is inserted in the beam path, is varied by shifting the glass wedges relative to each other. This is to vary the dispersion of the laser pulse. A plurality of second harmonic spectra is recorded as a function of the inserted glass thickness. In an iterative process, an error between the measured second harmonic spectra (for various glass thicknesses) and the corresponding simulations is minimized.

However, the various methods for characterizing an ultrashort laser pulse have various technical drawbacks and limitations such as a high degree of complexity, low sensitivity, the requirement for multiple laser pulses to perform the measurement, ambiguities in the measured profiles and high demands with respect to calibration of the optical setup, etc.

SUMMARY OF THE INVENTION

In view of the aforementioned prior art, it is an object of the invention to provide an enhanced device and method for characterizing an ultrashort laser pulse and an advantageous use of a self-contained optical assembly, wherein in particular the design effort should be minimized at the same time.

The object is solved by a device for characterizing an ultrashort laser pulse, the device comprising the following optical elements being arranged in the following order in an optical path of the device, along which an incident laser pulse propagates:

an imaging optical element configured to form a line focused laser pulse by imaging the incident laser pulse on a straight line perpendicular to an incident direction of the laser pulse, a first optical element configured to apply predetermined varying group delay dispersion on the line focused laser pulse, wherein a local value of the group delay dispersion, which is applied on the line focused laser pulse at a certain point varies as a function of the position of said point on the straight line, a non-linear optical element configured to generate a line focused second harmonic laser pulse of the line focused dispersed laser pulse, a second optical element configured to apply an angular dispersion on the line focused second harmonic laser pulse, which compensates for an angular dispersion, which is applied by the first optical element, an optical grating having a direction of diffraction that is perpendicular to the straight line along which the line focused laser pulse is imaged by the imaging optical element and a flat sensor configured to capture a diffraction image of the line focused second harmonic laser pulse, wherein the device further comprises a processing unit, which is configured to simulate the captured diffraction image by simulating the influence of at least the first optical element and the non-linear optical on a presumed laser pulse having a presumed frequency spectrum and spectral phase, wherein an error between the simulated and the captured diffraction image is minimized by iteratively finding best fit values of the frequency spectrum and spectral phase of the presumed laser pulse, wherein the ultrashort laser pulse is characterized by assigning it the best fit values.

In particular, the device for characterizing an ultrashort laser pulse further comprises an imaging optical element configured to image the second harmonic line focused laser pulse onto a plane of the subsequent sensor.

Advantageously, the device is capable of characterizing a single laser pulse. Within this context, it is an important aspect that varying group phase delay dispersion is applied on this single laser pulse. In turn, this is only possible because the incident laser pulse is transformed into a line-shaped laser pulse, projecting along a line perpendicular to the incident direction. The group delay dispersion, which is applied by the first optical element, varies along this line. In other words, the line focused laser pulse is subject to a first group delay dispersion at a first end of the line, wherein the group delay dispersion at the opposite second end differs from this first group delay dispersion. In the intermediate section between the two ends, the group delay dispersion increases or decreases from the first to the second boundary value.

Furthermore, the device according to aspects of the invention is designed to simultaneously capture the second harmonic spectrum for different glass thicknesses, i.e. for different dispersion. This renders the device particularly suitable for characterization of a single laser pulse. The captured image comprises spectral information of the second harmonic of the laser pulse with different group delay dispersion. The second harmonic is diffracted by the optical grating in a direction which is perpendicular to the line along which the line focused laser pulse is imaged. The dispersion varies along a dispersion axis, which is the direction along the line focus of the laser pulse. The dispersion axis is perpendicular to the laser propagation direction. For example, when the first optical element adds a first value of group delay dispersion at the top and a second and lower value at the bottom, the corresponding image of the second harmonic on the flat sensor comprises spectral information about the incident laser pulse having a low dispersion at a first edge of the image and further spectral information about the pulse having a higher group delay dispersion at the opposite edge.

The captured image comprises the full information for characterization of the laser pulse, in particular for determination of the frequency spectrum and the spectral phase. A full characterization of the laser pulse is retrievable in an iterative process. This completely characterizes the laser pulse temporal profile, except for the carrier-envelope phase.

For simulating the image on the flat sensor, a laser pulse having a certain frequency spectrum and spectral phase is assumed. Subsequently, a certain group phase shift or delay is added. It should be recognized, that not a fixed phase shift but a continuously varying phase shift is applied on the line focused laser pulse along the dispersion axis. A subsequent Fourier-transform of the pulse results in the electric field in the time domain.

The second harmonic generation is simulated by squaring the time-dependent field and subsequent inverse Fourier-transformation results in the second harmonic spectrum. This last step reflects the transformation from the time domain to the frequency domain by the optical grating.

The incident ultrashort laser pulse is characterized by minimizing an error between the measurement results, i.e. the captured spectrum of the second harmonic, and a simulated spectrum in an iterative process. A set a parameters describing the spectrum in particular frequency and phase is iteratively varied until a best fit for the corresponding simulated second harmonic spectrum is found. The parameters of this best fit are assumed to characterize the incident laser pulse.

Advantageously, a complete characterization of single ultrashort laser pulse is performed using a simple, robust and reliable optical setup. There is no need for time consuming calibration of a mechanically complex optical setup. The amount of group delay dispersion, which is added to the laser pulse along the straight line, is defined by the geometry and material of the first optimal element. For calibration purposes, the geometry can be measured very precisely with generally available measurement devices. Once the parameters are known, the remaining part of the optical setup is relatively insensitive with respect to slight de-calibration.

In an advantageous embodiment of the invention, the imaging optical element is a cylindrical lens having a symmetry axis, which is aligned perpendicular to the incident direction of the laser pulse or the imaging optical element is a slit having a longitudinal direction being aligned perpendicular to the incident direction.

Advantageously, the cylindrical lens collects the laser light and focuses it along the straight line, thereby increasing the light intensity of the line focused laser pulse. This renders the device suitable for characterization of low energy laser pulses. In contrast to the lens, a slit being aligned perpendicular to the incident direction does not focus the light of the laser pulse. However, it represents a simple and cost-effective solution for forming of the line focused laser pulse.

According to another advantageous embodiment of the invention, the first optical element is configured in that the local value of the group delay dispersion continuously, in particular linearly, varies as a function of the position on the straight line. Furthermore, the device is advantageously enhanced in that the first optical element and/or the second optical element are wedges of transparent material, in particular glass wedges.

The glass wedges are preferably manufactured from BK7-glass. However, other suitable glasses or transparent materials are applicable for manufacture of the first and/or second optical element.

The geometry of the glass wedge defines the local value of the varying group delay dispersion, which is applied on the line focused laser pulse. Advantageously, the glass wedge can be characterized with respect to its geometry very precisely using commonly available measurement gear. Furthermore, the glass wedge is mechanically stable and insensitive to environmental influences. The thermal expansion of glass is typically particularly low, thereby rendering the device suitable for operation under varying thermal conditions. In other words, the geometry of the glass wedges, which is crucial for the characterization of the ultrashort laser pulse, very little varies with temperature. Consequently, the influence of this thermal expansion or shrinking of the glass wedges on the characterization of the laser pulse is very low if not negligible.

In still another advantageous embodiment of the invention, the wedge has a straight lateral surface and a tilted lateral surface, the surfaces forming an acute angle, wherein the arms of the acute angle and the straight line along which the imaging optical element images the line focused laser pulse are arranged in a common plane, wherein in particular the straight surface of the wedge projects in a plane perpendicular to the incident direction.

This arrangement of the wedge representing the first optical element causes a maximum linearly varying group delay dispersion, which is applied along the straight line.

The device is further enhanced in that the non-linear optical element is a flat member being arranged between the tilted surface of the first optical element and the tilted surface of the second optical element, wherein in particular the non-linear optical element comprises a first and a second flat surface, the flat surfaces being parallel and opposite to each other.

In particular, the tilted surface of the first optical element and the first flat surface of the non-linear optical element and/or the tilted surface of the second optical element and the second flat surface of the non-linear optical element are arranged directly adjacent to each other so as to form a self-contained optical assembly comprising the non-linear optical element, the first optical element and the second optical element, wherein in particular the self-contained optical assembly forms a cuboid.

The self-contained optical assembly is mechanically stable. Furthermore, due to the reduced number of outer optical surfaces, the sensitivity with respect to dust or dirt is minimized thereby enhancing the overall robustness of the device.

In still another advantageous embodiment of the invention the device further comprises a pair of lenses, in particular a pair of convex lenses, being arranged in the optical path on either side of the grating and being configured to image at least a first order of the diffracted second harmonic laser pulse on the flat sensor.

The object is further solved by a method of characterizing an ultrashort laser pulse, the method comprising the following steps being performed in the following order:

imaging an incident laser pulse on a straight line perpendicular to an incident direction of the laser pulse so as to form a line focused laser pulse using an imaging optical element, applying predetermined varying group delay dispersion on the line focused laser pulse, wherein a local value of the group delay dispersion, which is applied on the line focused laser pulse at a certain point varies as a function of the position on the straight line, wherein varying group delay dispersion is applied using a first optical element, generating a line focused second harmonic laser pulse of the line focused dispersed laser pulse using a non-linear optical element, applying an angular dispersion on the second harmonic laser pulse, wherein said angular dispersion compensates for an angular dispersion, which is applied by the first optical element, using a second optical element, diffracting the line focused second harmonic laser pulse, wherein a direction of diffraction is perpendicular to the straight line along which the line focused laser pulse is imaged by the imaging optical element, using an optical grating and capturing a diffraction image of the line focused second harmonic laser pulse with a flat sensor, wherein for characterizing the ultrashort laser pulse, the captured diffraction image is simulated by simulating the influence of at least the first optical element and the non-linear optical element on a presumed laser pulse having a presumed frequency spectrum and spectral phase, wherein an error between the simulated and the captured diffraction image is minimized by iteratively finding best fit values of the frequency spectrum and spectral phase of the presumed laser pulse, wherein the ultrashort laser pulse is characterized by assigning it the best fit values.

In particular, the method is performed using a single ultrashort laser pulse.

In an advantageous embodiment of the invention, the method is further enhanced in that the predetermined varying group delay dispersion is applied in that the local value of the group delay dispersion continuously, in particular linearly, varies as a function of the position on the straight line.

Same or similar advantages, which have been already mentioned with respect to the device for characterizing an ultrashort laser pulse according to the invention apply to the method for characterization of an ultrashort laser pulse in the same or similar way and are therefore not repeated.

The object is further solved by use of a self-contained optical assembly comprising a first optical element, a second optical element and a non-linear optical element in a device for characterizing of an ultrashort laser pulse. In particular, the object is solved by use of this self-contained optical assembly in a device according to one or more aspects of the invention.

The used device is further characterized in that the first optical element is configured to apply predetermined varying group delay dispersion on an incident line focused laser pulse, being imaged along a straight line, wherein a local value of the group delay dispersion, which is applied at a certain point on the line focused laser pulse varies as a function of the position on the straight line, the non-linear optical element is configured to generate a line focused second harmonic laser pulse of the incident line focused laser pulse, and the second optical element is configured to apply an angular dispersion on the second harmonic laser pulse, which compensates for an angular dispersion, which is applied by the first optical dispersion element.

It is an important aspect of the invention that varying group delay dispersion is applied on the analyzed laser pulse along the straight line. This is performed by application of a glass wedge, for instance. Furthermore, a second harmonic of this linearly dispersed pulse is performed and subsequently, the second harmonic is corrected with respect to angular dispersion using a second glass wedge, for example.

In other words, an important element of a device for characterization of the ultrashort laser pulse is the self-contained optical assembly of the first optical element, the second optical element and the non-linear optical medium for generation of the second harmonic. Consequently, use of said self-contained optical assembly in a device for characterization of ultrashort laser pulses is particularly advantageous.

According to an embodiment of the invention, use of the self-contained optical assembly is further characterized in that the first optical element and/or the second optical element are wedges of transparent material, in particular glass wedges.

Furthermore, the wedge has a straight lateral surface and a tilted lateral surface, the surfaces forming an acute angle, wherein the arms of the acute angle and the straight line along which the line focused laser pulse projects are arranged in a common plane, wherein in particular the straight surface of the wedge projects in a plane perpendicular to the incident direction.

In still another advantageous embodiment, the non-linear optical element is a flat member being arranged between the tilted surface of the first optical element and the tilted surface of the second optical element, wherein in particular the non-linear optical element comprises a first and a second flat surface, the flat surfaces being parallel and opposite to each other.

In another advantageous embodiment, the tilted surface of the first optical element and the first flat surface of the non-linear optical element and/or the tilted surface of the second optical element and the second flat surface of the non-linear optical element are arranged directly adjacent to each other, wherein in particular the self-contained optical assembly forms a cuboid.

Further advantages of use of the self-contained optical assembly in a device for characterization of ultrashort laser pulses are similar to those mentioned with respect to said device. Consequently they shall not be repeated.

In particular, the flat sensor is a CCD or CMOS sensor. Furthermore, the first and/or the second optical element, i.e. the first and/or the second glass wedge, are manufactured from BK7. In particular, the pulse length or pulse duration of the ultrashort laser pulse is in the range of tens of femtoseconds, further in particular it has a spectrum that corresponds to a bandwidth-limited pulse duration below 50 fs, in particular to a bandwidth-limited pulse duration between 5 and 50 fs. The above aspects advantageously apply to all embodiments of the invention.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE FIGURES

The invention is described below, without restricting the general intent of the invention, based on exemplary embodiments, wherein reference is made expressly to the drawings with regard to the disclosure of all details according to the invention that are not explained in greater detail in the text. The drawings show in.

In the drawings, the same or similar types of elements or respectively corresponding parts are provided with the same reference numbers in order to prevent the item from needing to be reintroduced.

DETAILED DESCRIPTION OF THE FIGURES

Figure 1:
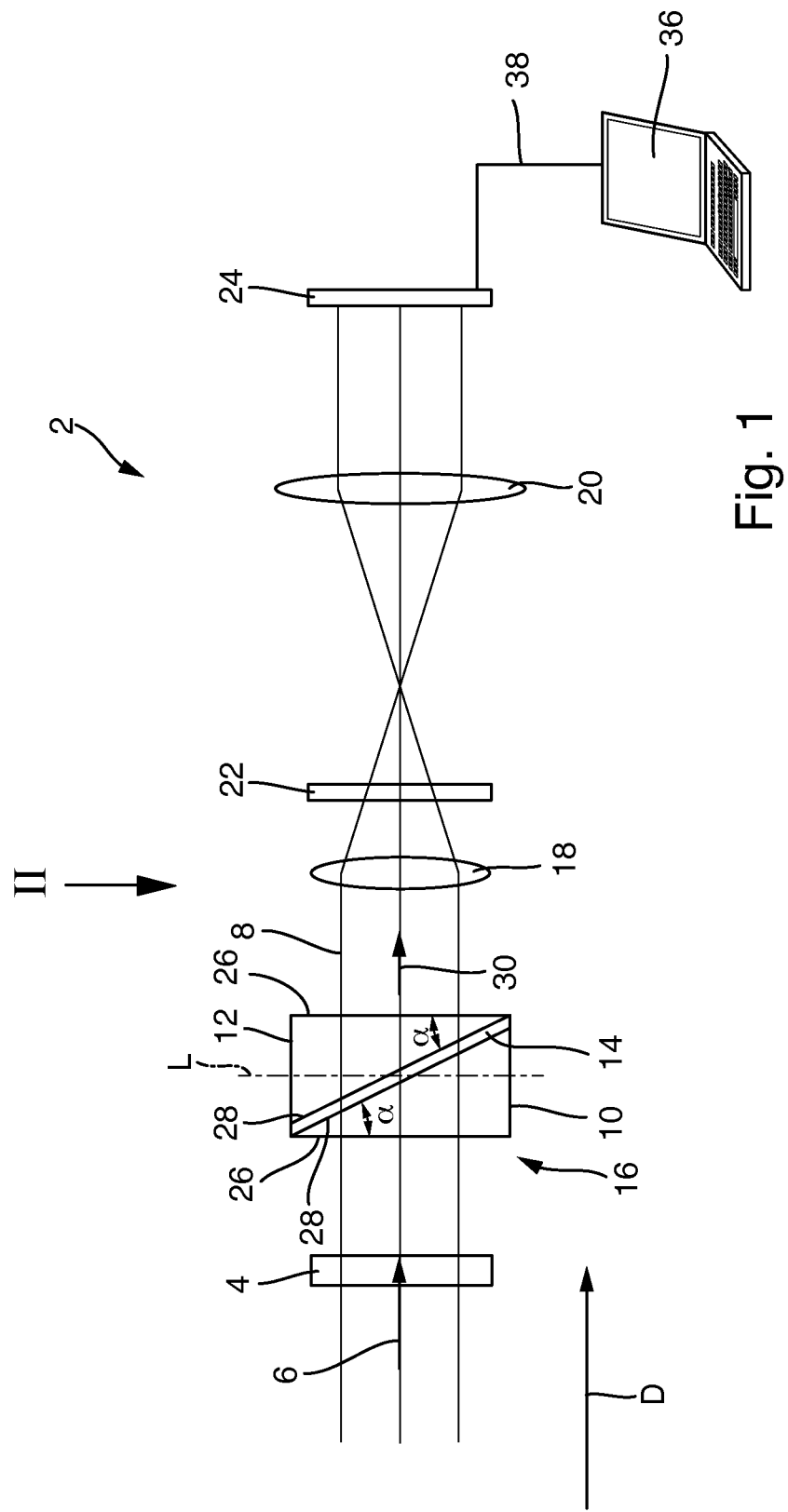
FIG. 1 a simplified side view showing a device for characterizing an ultrashort laser pulse according to an embodiment of the invention and FIG. 2 a corresponding top view of the device depicted in FIG. 1.

In FIG. 1, there is a device 2 for characterizing an ultrashort laser pulse, which comprises an imaging optical element 4, in particular a cylindrical lens. An incident laser pulse 6 (schematically illustrated by an arrow) travels through the device 2 along a beam path 8, which is schematically illustrated using straight lines on either side and a central line. Furthermore, the device 2 comprises a first optical element 10. A second optical element 12 is arranged reversely to the first optical element 10. Between the first and second optical element 10, 12, there is a non-linear optical element 14.

The first and second optical element 10, 12 and the non-linear optical element 14 provide a self-contained optical assembly 16, which will be explained in more detail further below. Downstream the self-contained optical assembly 16, there is a first convex lens 18 and a second convex lens 20. Between the first and second convex lens 18, 20, there is an optical grating 22. Finally, behind the second convex lens 20, a flat sensor 24 is provided. In particular, the flat sensor 24 is a CCD or CMOS sensor. This is coupled to a processing unit 36, for example a computer or workstation, which is configured to process captured images of the flat sensor 24. There is a data link 38 for data transfer between the processing unit 36 and the flat sensor 24.

The incident laser pulse 6, which can be generated by an arbitrary laser, in particular by a laser emitting ultrashort laser pulses having a pulse duration of a few tens of femtoseconds, is imaged by the imaging element 4 in a direction of a straight line L. The straight line L is indicated in FIG. 1 as a dash-dot line. The straight line L projects in a direction, which is perpendicular to an incident direction D of the incident laser pulse 6. The imaging element 4 is configured to form of a line focused laser pulse having a dispersion axis parallel to the straight line L. In particular, the imaging element 4 is a slit or a cylindrical lens. If a cylindrical lens is applied, a symmetry axis thereof is aligned perpendicular to the incident direction D, parallel to the straight line L. If a slit is applied as the imaging element 4, a longitudinal direction of said slit projects perpendicular to the incident direction D, parallel to the straight line L.

The line focused laser pulse follows the beam path 8 and enters the first optical element 10. The first optical element 10 is configured to apply predetermined varying group delay dispersion on the line focused laser pulse. In other words, a local value of the group delay dispersion, which is applied on the line focused laser pulse at a certain point on a line, which is parallel to the depicted straight line L, varies as a function of said position. Although dispersion is added inside the first optical element 10 and the straight line L partly projects outside said first optical element 10, reference will be made to the straight line L merely for better readability of the description. In particular, the first optical element 10 is a glass wedge. A suitable material for said wedge is BK7.

The applied value of group delay dispersion varies with a local thickness of the glass, wherein parts of the laser pulse, which travel through thinner regions of the glass wedge, experience lower group delay dispersion compared to parts of the incident laser pulse 6, which travel through thicker parts of the glass wedge.

Further in particular, the second optical element 12, similar to the first optical element 10, is also a glass wedge. Similarly, BK7 can be applied as a suitable material. Between the first and the second optical element 10, 12, there is the non-linear optical element 14, which is configured to generate a second harmonic laser pulse of the incident laser pulse 6. For example, the non-linear optical element 14 is a non-linear crystal, for example a β-BBO crystal, which is suitable for 800 nm laser pulses.

Figure 2:
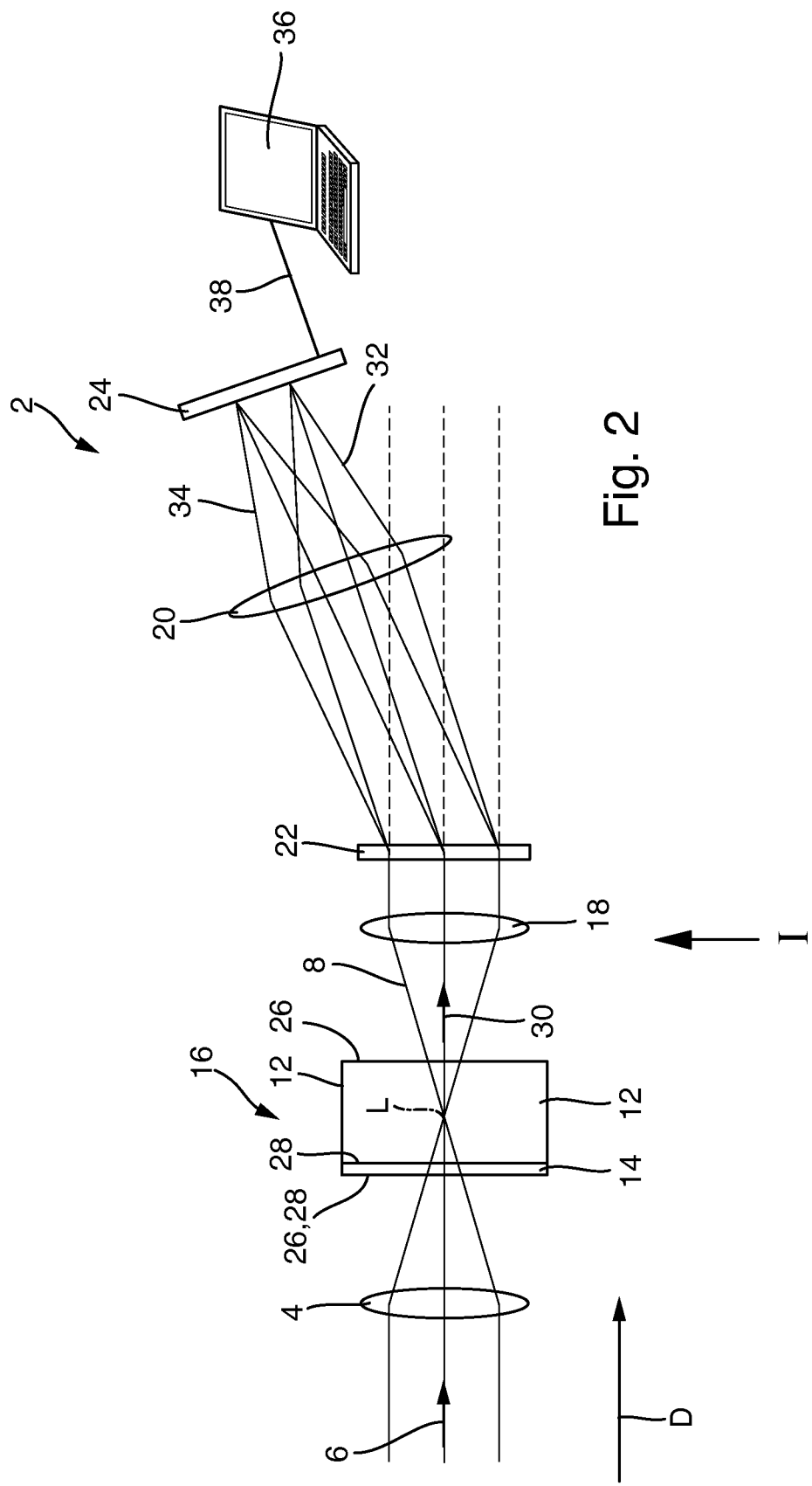

In the embodiment of FIGS. 1 and 2, the glass wedges forming the first and second optical element 10, 12, respectively, are identical.

The glass wedge or the wedges include a straight lateral surface 26 and a tilted lateral surface 28. The surfaces 26, 28 form an acute angle α. The first and second optical element 10, 12, in particular the glass wedges forming said elements, are aligned in that the arms of the acute angle α, which are in the tilted lateral surface 28 and in the straight lateral surface 26, respectively, and the straight line L, along which the imaging element 4 images the line focused laser pulse, are arranged in a common plane. According to the embodiment, the straight surfaces 26 of the first and second optical element 10, 12 project in a plane, which is perpendicular to the incident direction D. In other words, the laser pulse 6 enters the first optical element 10 in a direction perpendicular to a straight lateral surface 26 thereof. A second harmonic of said laser pulse 6, which is generated in the non-linear optical element 14 leaves the second optical element 12 in a direction perpendicular to the straight lateral surface 26 of said second optical element 12.

The non-linear optical element 14 is in particular a flat member, which is arranged between the tilted surface 28 of the first optical element 10 and the tilted surface 28 of the second optical element 12. Furthermore, the non-linear optical element 14 in particular includes a first and a second flat surface, these flat surfaces being parallel and opposite to each other. In the embodiment of FIG. 1, the tilted surface 28 of the first optical element 10 and a first flat surface of the non-linear optical element 14 and the tilted surface 28 of the second optical element 12 and an opposite second flat surface of the non-linear optical element 14 are arranged to be directly adjacent to each other. The adjacent surfaces are preferably sealed, for example bonded to each other using a suitable bonding material.

This is to form the self-contained optical assembly 16 including the non-linear optical element 14, the first optical element 10 and the second optical element 12. Particularly, the self-contained optical assembly 16 forms a cuboid or cube. The glass wedge forming the first optical element 10 is arranged directly in front of the crystal forming the non-linear optical element 14.

A second harmonic 30 of the incident laser pulse 6 is generated in the non-linear optical element 14 and leaves the self-contained optical assembly 16 in the beam path 8. In the second optical element 12 an angular dispersion, which is applied by the first optical element 10, is compensated. After the second harmonic 30 has left the self-contained optical assembly 16, it enters a first convex lens 18. The first and the second convex lenses 18, 20 are configured to form a pair of lenses being arranged in the optical path 8 and being configured to image at least a first order of a diffracted second harmonic laser pulse 30 on the flat sensor 24. Diffraction of the second harmonic laser pulse 30 takes place in the grating 22. In other words, the grating 22 converts the second harmonic laser pulse 30 from the time domain to the frequency domain.

In FIG. 2, there is a simplified top view on the device 2 for characterization of an ultrashort laser pulse, which is known from FIG. 1. The top view in FIG. 2 shows the device 2 in viewing direction II in FIG. 1. The side view in FIG. 1 is in direction denoted I in FIG. 2.

The first optical element 10 is in particular configured in that the local value of the group delay dispersion varies continuously, in particular linearly as a function of the position on the straight line L. When the first optical element 10 is implemented as a glass wedge, this linearly varying group delay dispersion is applied due to the linearly varying thickness of a glass in the beam path 8, which is due to the shape of the wedge itself.

In FIG. 1, after the grating 22, a beam path of the $0^{th}$ order is denoted in dashed line. The $0^{th}$ order is not detected in the analysis but rather the first order, which is diffracted by the grating 22 in direction of the flat sensor 24.

However, the $0^{th}$ order can be used to characterize the intensity distribution of the line focus as a secondary alignment and focus quality diagnostic.

By way of an example, a beam path 32 of a first order diffraction at 400 nm and a beam path 34 of a first order diffraction at 800 nm are schematically illustrated.

Advantageously, the device 2 is capable of characterizing a single laser pulse. It is an important aspect that varying group phase delay dispersion is applied on this single laser pulse by the first optical element 10. This is only possible because the incident laser pulse 6 is transformed into a line-shaped laser pulse, projecting along the straight line L perpendicular to the incident direction D.

Furthermore, the device 2 is designed to simultaneously capture the second harmonic spectrum for different glass thicknesses, i.e. for different dispersion values. The image captured by the flat sensor 24 comprises spectral information of the second harmonic laser pulse 30 with different amounts of group delay dispersion. This is because the second harmonic laser pulse 30 is diffracted by the optical grating 22 in a direction which is perpendicular to the straight line L. This becomes clear when considering the beam path 8 in FIG. 1 and FIG. 2.

The dispersion varies along the straight line L. For example, when the first optical element 10 adds a first value of group delay dispersion at the top of the line focused laser pulse (see FIG. 1) and a second and lower value at the bottom, the corresponding image of the second harmonic laser pulse 30 on the flat sensor 24 comprises spectral information about the incident laser pulse 6 having a low and a high dispersion. Due to the image inversion by the imaging lenses 18, 20, the spectrum for low dispersion can be found at the bottom and the spectrum for high dispersion can be found at the top of the captured image.

The image, which is captured by the flat sensor 24, comprises the full information for characterization of the incident laser pulse 6. In particular the frequency spectrum and the spectral phase can be determined. A full characterization of the laser pulse 6 is retrievable in an iterative process, which is performed by the processing unit 36. This completely characterizes the laser pulse temporal profile, except for the carrier-envelope phase.

For simulating the image on the flat sensor 24, firstly a laser pulse having a certain frequency spectrum and spectral phase is assumed. The laser pulse can be described by the complex spectral amplitude as it is shown in the below formula 1.

$$\tilde{U}(\omega)=|\tilde{U}(\omega)|\exp\{i\phi(\omega)\} \quad (1)$$

The varying group phase shift, which is added by the first optical element 10, is simulated using the following expression 2.

$$\exp\{ixk(\Omega)\} \quad (2)$$

Within this context, the first optical element is a glass wedge, wherein the value of the variable x indicates the local thickness of the glass. The value of x varies along the straight line L. The correlation between the local glass thickness x and the position on the straight line L is defined by the geometry of the glass wedge and is derivable using simple geometric relations. Furthermore, in expression 2, $k(\Omega)$ is the frequency dependent phase per unit length of the glass, which can be calculated using the Sellmeier equations.

It should be recognized, that not a fixed phase shift but a continuously varying phase shift is applied on the line focused laser pulse along its dispersion axis.

The spectrum, which is captured by the flat sensor 24 is simulated using the below formula 3. The assumed laser pulse (formula 1) is phase shifted (expression 2). A subsequent Fourier-transform of the pulse results in the electric field in the time domain. The second harmonic generation is simulated by squaring the time-dependent field and subsequent inverse Fourier-transform results in the second harmonic spectrum. This last step reflects the transformation from the time domain to the frequency domain by the optical grating 22.

$$S(\omega,x)_{sim}=|\int(\int \tilde{U}(\Omega)\exp\{ixk(\Omega)\}\exp(i\Omega t)d\Omega)^2 \exp(-i\omega t) dt|^2 \quad (3)$$

The incident ultrashort laser pulse 6 is characterized by minimizing an error between the measurement result, i.e. the captured spectrum of the second harmonic, and the simulated spectrum $S(\omega,x)_{sim}$ in an iterative process.

A set a parameters describing the assumed laser pulse, in particular the frequency spectrum and spectral phase, is iteratively varied until a best fit for the captured spectrum is found. The parameters of this best fit are assumed to characterize the incident laser pulse 6.

For the calculation of the simulation and the subsequent fitting of the captured image, the device 2 comprises the processing unit 36, for example a computer or workstation having suitable software running thereon. The processing unit 36 is configured to perform the above described process.

In a method of characterizing the ultrashort laser pulse 6, the following steps are performed. Firstly, the incident laser pulse 6 is imaged in a direction of the straight line 6 perpendicular to the incident direction D. Subsequently, predetermined varying group delay dispersion is applied on the line focused laser pulse using the first optical element 10. The second harmonic laser pulse 30 is generated in the non-linear optical medium 14. An angular dispersion of the first optical element 10 is corrected using the second optical element 12. The second harmonic laser pulse 30 is subsequently diffracted by the grating 22. The diffracted second harmonic laser pulse is detected using the flat sensor 24. The captured image is simulated in an iterative process using the processing unit 36.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics. Features which are combined with the wording "in particular" or "especially" are to be treated as preferred embodiments.

TABLE OF REFERENCES 2 device
4 imaging element
6 laser pulse
8 beam path
10 first optical element
12 second optical element
14 non-linear optical element
16 self-contained optical assembly
18 first convex lens
20 second convex lens
22 grating
24 flat sensor
26 straight lateral surface
28 tilted lateral surface
30 second harmonic pulse
32 beam path
34 beam path
36 processing unit
38 data link
L straight line
D incident direction

What is claimed is:

1. A device (2) for determining an ultrashort laser pulse (6), the device (2) comprising the following optical elements being arranged in the following order in an optical path (8) along which an incident laser pulse (6) propagates:

an imaging optical element (4) configured to form a line focused laser pulse by imaging the incident laser pulse (6) on a straight line (L) perpendicular to an incident direction (D) of the laser pulse (6);

a first optical element (10) configured to apply predetermined varying group delay dispersion on the line focused laser pulse, wherein a local value of the group delay dispersion, which is applied on the line focused laser pulse at a certain point varies as a function of the position of said point on the straight line (L);

a non-linear optical element (14) configured to generate a line focused second harmonic laser pulse (30) of the line focused dispersed laser pulse;

a second optical element (12) configured to apply an angular dispersion on the line focused second harmonic laser pulse (30), which compensates for an angular dispersion, which is applied by the first optical element (10);

an optical grating (22) having a direction of diffraction that is perpendicular to the straight line (L) along which the line focused laser pulse (6) is imaged by the imaging optical element (4); and a flat sensor (24) configured to capture a diffraction image of the line focused second harmonic laser pulse, wherein the device (2) further comprises a processing unit (36), which is configured to simulate the captured diffraction image by simulating the influence of at least the first optical element (10) and the non-linear optical element (14) on a presumed laser pulse having a presumed frequency spectrum and spectral phase, wherein an error between the simulated and the captured diffraction image is minimized by iteratively finding best fit values of the frequency spectrum and spectral phase of the presumed laser pulse, wherein the ultrashort laser pulse (6) is characterized by assigning it the best fit values.

2. The device (2) according to claim 1, wherein the imaging optical element (4) is a cylindrical lens having a symmetry axis, which is aligned perpendicular to the incident direction (D) of the laser pulse (6) or the imaging optical element (4) is a slit having a longitudinal direction being aligned perpendicular to the incident direction (D).

3. The device (2) according to claim 1, wherein the first optical element (10) is configured in that the local value of the group delay dispersion continuously varies as a function of the position on the straight line (L).

4. The device (2) according to claim 1, wherein the first optical element (10) and the second optical element (12) are wedges of transparent material.

5. The device (2) according to claim 4, wherein the wedge has a straight lateral surface (26) and a tilted lateral surface (28), the surfaces (26, 28) forming an acute angle ($\alpha$), wherein the arms of the acute angle ($\alpha$) and the straight line (L) along which the imaging optical element (4) images the line focused laser pulse are arranged in a common plane, wherein in particular the straight surface (26) of the wedge projects in a plane perpendicular to the incident direction (D).

6. The device (2) according to claim 5, wherein the non-linear optical element (14) is a flat member being arranged between the tilted surface (28) of the first optical element (10) and the tilted surface (28) of the second optical element (12), wherein in particular the non-linear optical element (14) comprises a first and a second flat surface, the flat surfaces being parallel and opposite to each other.

7. The device (2) according to claim 6, wherein the tilted surface (28) of the first optical element (10) and the first flat surface of the non-linear optical element (14) and the tilted surface (28) of the second optical element (14) and the second flat surface of the non-linear optical element (14) are arranged directly adjacent to each other so as to form a self-contained optical assembly (16) comprising the non-linear optical element (14), the first optical element (10) and the second optical element (12).

8. The device (2) according to claim 1, further comprising a pair of lenses (18, 20), being arranged in the optical path (8) on either side of the grating (22) and being configured to image at least a first order of the diffraction image of the line focused second harmonic laser pulse on the flat sensor (24).

9. A method of characterizing an ultrashort laser pulse (6), the method comprising the following steps being performed in the following order:
   imaging an incident laser pulse (6) on a straight line (L) perpendicular to an incident direction (D) of the laser pulse (6) so as to form a line focused laser pulse using an imaging optical element (4);
   applying predetermined varying group delay dispersion on the line focused laser pulse, wherein a local value of the group delay dispersion, which is applied on the line focused laser pulse at a certain point varies as a function of the position on the straight line (L), wherein the varying group delay dispersion is applied using a first optical element (10);
   generating a line focused second harmonic laser pulse of the line focused dispersed laser pulse (6) using a non-linear optical element (14);
   applying an angular dispersion on the second harmonic laser pulse (30), wherein said angular dispersion compensates for an angular dispersion, which is applied by the first optical element (10), using a second optical element (12);
   diffracting the line focused second harmonic laser pulse (30), wherein a direction of diffraction is perpendicular to the straight line (L) along which the line focused laser pulse is imaged by the imaging optical element (4), using an optical grating (22); and
   capturing a diffraction image of the line focused second harmonic laser pulse with a flat sensor (24),
   wherein for characterizing the ultrashort laser pulse (6),
   the captured diffraction image is simulated by simulating the influence of at least the first optical element (10) and the non-linear optical element (14) on a presumed laser pulse having a presumed frequency spectrum and spectral phase, wherein an error between the simulated and the captured diffraction image is minimized by iteratively finding best fit values of the frequency spectrum and spectral phase of the presumed laser pulse, wherein the ultrashort laser pulse (6) is characterized by assigning it the best fit values.

10. The method according to claim 9, wherein the method is performed using a single ultrashort laser pulse (6).

11. The method according to claim 9, wherein the predetermined varying group delay dispersion is applied in that the local value of the group delay dispersion continuously varies as a function of the position on the straight line (L).

12. A method of using a self-contained optical assembly (16) comprising a first optical element (10), a second optical element (12) and a non-linear optical element (14) in a device (2) for characterizing an ultrashort laser pulse according to claim 1, wherein
   the first optical element (10) is configured to apply predetermined varying group delay dispersion on an incident line focused laser pulse, being imaged along a straight line (L), wherein a local value of the group delay dispersion, which is applied at a certain point on the line focused laser pulse varies as a function of the position on the straight line (L);
   the non-linear optical element (14) is configured to generate a line focused second harmonic laser pulse (30) of the incident line focused laser pulse (6); and
   the second optical element (12) is configured to apply an angular dispersion on the second harmonic laser pulse (30), which compensates for an angular dispersion, which is applied by the first optical dispersion element (10).

13. The method of using the self-contained optical assembly (16) according to claim 12, wherein the first optical element (10) and the second optical element (12) are wedges of transparent material.

14. The method of using the self-contained optical assembly (16) according to claim 13, wherein the wedge has a straight lateral surface (26) and a tilted lateral surface (28), the surfaces (26, 28) forming an acute angle ($\alpha$), wherein the arms of the acute angle ($\alpha$) and the straight line (L) along which the line focused laser pulse projects are arranged in a common plane, wherein in particular the straight surface (26) of the wedge projects in a plane perpendicular to the incident direction (D).

15. The method of using the self-contained optical assembly (16) according to claim 14, wherein the non-linear optical element (14) is a flat member being arranged between the tilted surface (28) of the first optical element (10) and the tilted surface (28) of the second optical element (12), wherein the non-linear optical element (14) comprises a first and a second flat surface, the flat surfaces being parallel and opposite to each other, and further wherein the tilted surface (28) of the first optical element (10) and the first flat surface of the non-linear optical element (14) and the tilted surface (28) of the second optical element (12) and the second flat surface of the non-linear optical element (14) are arranged directly adjacent to each other, wherein the self-contained optical assembly (16) forms a cuboid.

* * * * *